United States Patent
Jeong et al.

(10) Patent No.: US 11,151,375 B2
(45) Date of Patent: Oct. 19, 2021

(54) LENS MODULE AND IRIS RECOGNITION CAMERA MODULE COMPRISING SAME, AND IRIS RECOGNITION CAMERA SYSTEM AND TERMINAL COMPRISING SAME

(71) Applicant: LG INNOTEK CO., LTD., Seoul (KR)

(72) Inventors: Yu Kyeong Jeong, Seoul (KR); Min Kim, Seoul (KR); Sang Hun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 251 days.

(21) Appl. No.: 16/068,621

(22) PCT Filed: Jan. 5, 2017

(86) PCT No.: PCT/KR2017/000118
§ 371 (c)(1),
(2) Date: Jul. 6, 2018

(87) PCT Pub. No.: WO2017/119726
PCT Pub. Date: Jul. 13, 2017

(65) Prior Publication Data
US 2019/0171878 A1 Jun. 6, 2019

(30) Foreign Application Priority Data

Jan. 6, 2016 (KR) .................. 10-2016-0001332
Jan. 11, 2016 (KR) .................. 10-2016-0003061

(51) Int. Cl.
*G06K 9/00* (2006.01)
*G02B 13/00* (2006.01)
(Continued)

(52) U.S. Cl.
CPC ........... *G06K 9/00617* (2013.01); *G02B 3/14* (2013.01); *G02B 7/028* (2013.01); *G02B 13/008* (2013.01);
(Continued)

(58) Field of Classification Search
CPC ............. G02B 13/0045; G02B 13/008; G02B 27/4205; G02B 3/14; G02B 5/32;
(Continued)

(56) References Cited

U.S. PATENT DOCUMENTS 6,157,496 A * 12/2000 Betensky ....... G02B 15/143105
359/690
2003/0210473 A1 * 11/2003 Ohashi ................ G02B 15/177
359/694
(Continued)

FOREIGN PATENT DOCUMENTS

| CN | 101030013 A | 9/2007 |
| CN | 101681021 A | 3/2010 |

(Continued)

OTHER PUBLICATIONS

International Search Report in International Application No. PCT/KR2017/000118, filed Jan. 5, 2017.
(Continued)

*Primary Examiner* — Joseph P Martinez
*Assistant Examiner* — Vipin Patel
(74) *Attorney, Agent, or Firm* — Saliwanchik, Lloyd & Eisenschenk

(57) ABSTRACT

One embodiment of an iris recognition camera system comprises: an optical unit for collecting optical information of an iris; and an imaging unit for outputting the optical information of the iris obtained by the optical unit, wherein the optical unit comprises: a first group having a first thickness and refracting light incident from an object; and a
(Continued)

second group disposed on the back surface of the first group and comprising at least one lens, wherein the first group comprises a holographic optical element (HOE).

6 Claims, 16 Drawing Sheets

(51) Int. Cl.
*G06K 9/20* (2006.01)
*G02B 27/42* (2006.01)
*G02B 3/14* (2006.01)
*G02B 7/02* (2021.01)
*G02B 5/32* (2006.01)

(52) U.S. Cl.
CPC ..... *G02B 13/0045* (2013.01); *G02B 27/4205* (2013.01); *G06K 9/00* (2013.01); *G06K 9/00604* (2013.01); *G06K 9/20* (2013.01); *G02B 5/32* (2013.01)

(58) Field of Classification Search
CPC ...... G02B 7/028; G06K 9/00; G06K 9/00604; G06K 9/00617; G06K 9/20
See application file for complete search history.

(56) References Cited

U.S. PATENT DOCUMENTS

| | | | | |
|---|---|---|---|---|
| 2006/0098097 | A1* | 5/2006 | Wach | G02B 27/0025 348/207.99 |
| 2010/0110275 | A1* | 5/2010 | Mathieu | G02B 27/0075 348/360 |
| 2014/0036139 | A1 | 2/2014 | Hamada | |
| 2017/0337442 | A1* | 11/2017 | Um | G06K 9/00919 |

FOREIGN PATENT DOCUMENTS

| | | |
|---|---|---|
| CN | 101770573 A | 7/2010 |
| CN | 102855471 A | 1/2013 |
| CN | 105005137 A | 10/2015 |
| CN | 204791066 U | 11/2015 |
| KR | 10-2005-0022461 A | 3/2005 |
| KR | 10-2008-0051905 A | 6/2008 |
| KR | 10-2009-0130696 A | 12/2009 |
| KR | 10-2012-0020024 A | 3/2012 |
| KR | 10-2015-0037628 A | 4/2015 |
| KR | 10-2015-0138755 A | 12/2015 |
| WO | WO 2014/115682 A1 | 7/2014 |

OTHER PUBLICATIONS

Office Action dated May 26, 2021 in Chinese Application No. 201780014148.2.

* cited by examiner

FIG. 2
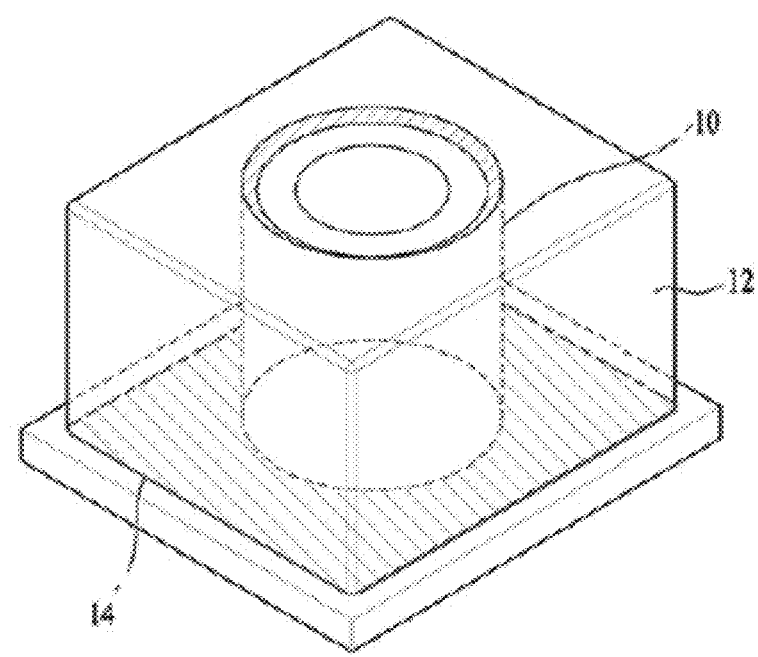
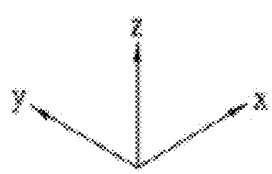

LENS MODULE AND IRIS RECOGNITION CAMERA MODULE COMPRISING SAME, AND IRIS RECOGNITION CAMERA SYSTEM AND TERMINAL COMPRISING SAME

CROSS-REFERENCE TO RELATED APPLICATIONS

This application is the U.S. national stage application of International Patent Application No. PCT/KR2017/000118, filed Jan. 5, 2017, which claims priority to Korean Application Nos. 10-2016-0001332, filed Jan. 6, 2016; and 10-2016-0003061, filed Jan. 11, 2016, the disclosures of each of which are incorporated herein by reference in their entirety.

TECHNICAL FIELD

Embodiments relate to a lens module and an iris recognition camera module comprising the same, and an iris recognition camera system and a terminal comprising the same.

BACKGROUND ART

Contents which will be described hereinafter do not constitute related art and serve simply to provide background information of embodiments.

For the sake of identification for entrance security, etc., an iris recognition system having high security and accuracy, as compared to other identification means, is used. Such an iris recognition system is a system in which a specific person is identified by datarizing a characteristic pattern of an iris image photographed by a camera using an image processing technique and then comparing obtained data to iris data of a user which is registered in advance.

Recently, the iris recognition system is applied to mobile devices and thus utilization of the iris recognition system as a personal security system in daily life is increasing.

On the assumption that resolution of a designated object is maintained in an iris recognition camera system, a recognition distance of an iris recognition camera may be determined by the size of a unit pixel of a sensor and the focal length of a lens.

For example, if the size of the unit pixel is 1.12 μm and the focal length of the lens is 4.0 mm, an object distance satisfying the above-described resolution of the designated object, i.e., 15.7 pixels/mm, may be 230 mm.

Therefore, one of physical methods to increase a distance at which an object may be recognized in the iris recognition camera system is to increase a focal length.

However, if a focal length is increased so as to increase a recognition distance of an object, the volume of the iris recognition camera system is increased.

For example, a camera module which is generally used in the iris recognition camera system may include a lens barrel and an optical unit including a plurality of lenses provided in the lens barrel and, if the size of the optical unit is increased to increase a focal length, the volume of the lens barrel accommodating the optical unit is increased.

A lens module may include one lens or a plurality of lenses aligned in an optical axis direction to form an optical system. Such a lens module may be used in various apparatuses.

Particularly, the lens module may be used in an iris recognition camera module. The lens module used in the iris recognition camera module may be provided such that magnification change of a subject is suppressed so as to photograph an accurate and precise image of an iris.

However, a focal length of the lens module may be changed according change in ambient temperature and change in other ambient environments, a magnification of a photographed subject may be changed according to change in the focal length, and quality of an image photographed by the camera module may be lowered according to change in the focal length.

DISCLOSURE

Technical Problem

Embodiments provide an iris recognition camera system having an optical unit which may increase a recognition distance of a designated object while maintaining resolution of the object and maintaining a constant total volume of the camera system.

Embodiments provide a lens module which may suppress change in focal length and magnification according to temperature, change in image quality, etc., and an iris recognition camera module having the same.

Technical objects of embodiments are not limited to the above-described objects, and additional advantages, objects, and features of the embodiments will be set forth in part in the description which follows and in part will become apparent to those having ordinary skill in the art upon examination of the following or may be learned from practice of the embodiments.

Technical Solution

In one embodiment, an iris recognition camera system includes an optical unit configured to collect optical information of an iris, and an imaging unit configured to output the optical information of the iris obtained from the optical unit, wherein the optical unit includes a first group having a first thickness and refracting light incident from an object, and a second group disposed on the back surface of the first group and including at least one lens, wherein the first group includes a holographic optical element (HOE).

In another embodiment, an iris recognition camera system includes an optical unit configured to collect optical information of an iris, an imaging unit configured to output the optical information of the iris obtained from the optical unit, a calculation unit configured to analyze a position of a photographed iris image, generated by the imaging unit, on an image sensor, and a control unit configured to control driving of at least one display unit corresponding to a result value outputted from the calculation unit, wherein the optical unit includes a first group having positive refractive power and a second group having negative refractive power, wherein the first group includes no lens.

In another embodiment, a lens module includes a first lens unit including at least one lens, a second lens unit provided so as to be opposite to the first lens unit and to be spaced apart from the first lens unit in a first direction corresponding to an optical axis direction, and including at least one lens, and a variable lens unit arranged between the first lens unit and the second lens unit and configured to control a focal length of the lens module.

In another embodiment, a lens module includes a first lens unit including at least one lens, a second lens unit provided so as to be opposite to the first lens unit and to be spaced apart from the first lens unit in a first direction corresponding to an optical axis direction, and including at least one lens, a variable lens unit arranged between the first lens unit and the second lens unit and configured to control a focal length of the lens module by controlling control a diopter of the lens module, being a reciprocal of the focal length of the lens module, and a control unit configured to control the diopter of the variable lens unit.

In yet another embodiment, an iris recognition camera module includes the lens module, and an image sensor, wherein the image sensor is arranged at the rear of the second lens unit in a proceeding direction of incident light so as to be opposite to the second lens unit and to be spaced apart from the second lens unit in the first direction.

Advantageous Effects

An iris recognition camera module in accordance with one embodiment may provide an optical unit which increases a recognition distance of a designated object while maintaining resolution of the object and maintaining a constant total volume of the camera system, simultaneously.

A lens module and an iris recognition camera module including the same in accordance with one embodiment may effectively suppress change in a focal length of the lens module and change in the magnification of a subject due to change in the focal length, as an ambient temperature is changed, and thus inhibit lowering of performance of the lens module and the camera module.

A lens module and an iris recognition camera module including the same in accordance with one embodiment may suppress focal length change according to temperature change of a variable lens unit and thus photograph an image of great quality in spite of change in ambient temperature.

DESCRIPTION OF DRAWINGS

FIG. 2 is a perspective view illustrating an iris recognition camera in accordance with the embodiment.

BEST MODE

Figure 1:
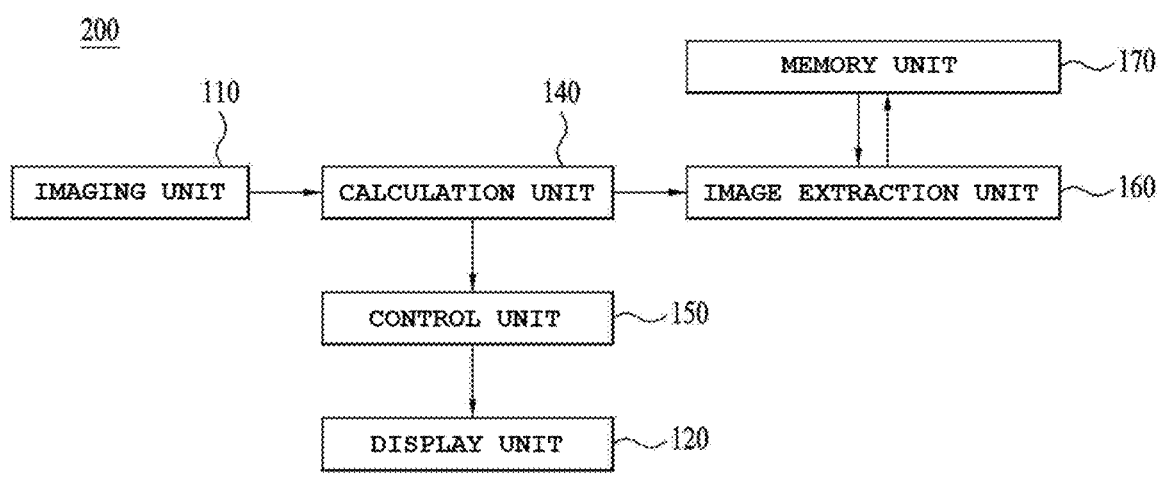
FIG. 1 is a block diagram of an iris recognition camera system in accordance with one embodiment.

Hereinafter, embodiments will be described with reference to the annexed drawings and description. However, the embodiments set forth herein may be variously modified, and it should be understood that there is no intent to limit the disclosure to the particular forms disclosed. However, the embodiments are to cover all modifications, equivalents, and alternatives falling within the spirit and scope of the disclosure as defined by the claims. Here, sizes or shapes of elements illustrated in the drawings may be exaggerated for clarity and convenience of description.

It will be understood that, although the terms "first", "second", etc. may be used herein to describe various elements, these terms do not limit the elements. These terms are used only to discriminate one substance or element from other substances or elements. Further, terms specially defined in consideration of the configurations and functions of the embodiments serve only to describe the embodiments and do not limit the scope of the disclosure.

In the following description of the embodiments, it will be understood that, when each element is referred to as being formed "on" or "under" another element, it can be directly "on" or "under" the other element or be indirectly formed with one or more intervening elements therebetween. Further, when an element is referred to as being formed "on" or "under" another element, not only the upward direction of the former element but also the downward direction of the former element may be included.

In addition, it will be understood that, although the relational terms "on/above/upper", "under/below/lower", etc. may be used herein to describe various elements, these terms neither necessarily require nor connote any physical or logical relations between substances or elements or the order thereof, and are used only to discriminate one substance or element from other substances or elements.

Further, in the drawings, a Cartesian coordinate system (x, y, z) may be used. In the drawings, the x-axis and the y-axis define a plane which is perpendicular to an optical axis and, for convenience, an optical axis direction (the z-axis direction) may be referred to as a first direction, the x-axis direction may be referred to as a second direction, and the y-axis direction may be referred to as a third direction.

FIG. 1 is a block diagram illustrating a schematic configuration of an iris recognition camera system in accordance with one embodiment.

An iris recognition camera system 200 shown in FIG. 1 may include an imaging unit 110, display units 120, a calculation unit 140, a control unit 150, an image extraction unit 160 and a memory unit 170.

An iris image photographed by the imaging unit 110 may be converted into an electrical signal by an image sensor and then the electrical signal may be transmitted to the calculation unit 140.

The calculation unit 140 may analyze a position of the photographed iris image on the image sensor, on which the image is formed.

Analysis of the position of the photographed iris image by the calculation unit 140 may be analysis as to whether or not the photographed iris image is located within a reference region.

The reference region may be varied according to sensitivity of the iris recognition camera system and, for example, the reference region may be an optical field including the center of the image sensor when the area of the image sensor is divided into a plurality of optical fields.

A position result value of the photographed iris image, analyzed by the calculation unit 140, may be transmitted to the control unit 150.

The control unit 150 may transmit a driving signal to the display units 120.

The control unit 150 may control driving of at least one display unit 120 corresponding to the result value outputted from the calculation unit 140.

The control unit 150 may be connected to a driving unit of a light emitting module included in the display unit 120.

Further, the control unit 150 may operate at least one of a plurality of light emitting modules included in the display unit 120 according to the analysis result value of the calculation unit 140. Further, if the iris recognition camera system 200 includes a plurality of display units 120, the control unit 150 may operate light emitting modules included in at least one of the display units 120.

If it is analyzed that the photographed iris image deviates from the reference region of the image sensor, the control unit 150 may transmit a signal to drive the display units 120 according to the analysis result value.

For example, the control unit 150 may control driving of the display units 120 so as to analyze a deviation direction of the photographed iris image from the reference region and to display a moving direction to the outside.

Further, if it is analyzed that the photographed iris image is located within the reference region of the image sensor, the control unit 150 may correspondingly transmit a signal to drive the display units 120.

For example, the control unit 150 may control the display units 120 so as to be flickered so as to display that an iris is located within the reference region to the outside.

The iris recognition camera system 200 may include the image extraction unit 160.

The image extraction unit 160 may extract an authenticated iris image.

The authenticated iris image may be a final iris image used for iris recognition, i.e., correspond to an iris image located within the reference region, out of photographed iris images.

That is, if it is analyzed that the photographed iris image is located within the reference region of the image sensor, the calculation unit 140 may transmit a signal to the image extraction unit 160.

The image extraction unit 160 may capture and enlarge the photographed iris image located within the reference region so that the photographed iris image may be used as an authenticated iris image for iris recognition. The image extraction unit 160 may store the captured authenticated iris image.

The iris recognition camera system 200 in accordance with the embodiment may include the memory unit 170 which stores a reference iris image.

The reference iris image may be acquired by storing an iris image of a user authenticated using the iris recognition camera system, or be acquired by datarizing an iris specific pattern from a stored iris image.

For example, the reference iris image may be data obtained by analyzing and digitizing a specific pattern of a user's iris.

The imaging unit 110 may include the image sensor.

Figure 3:
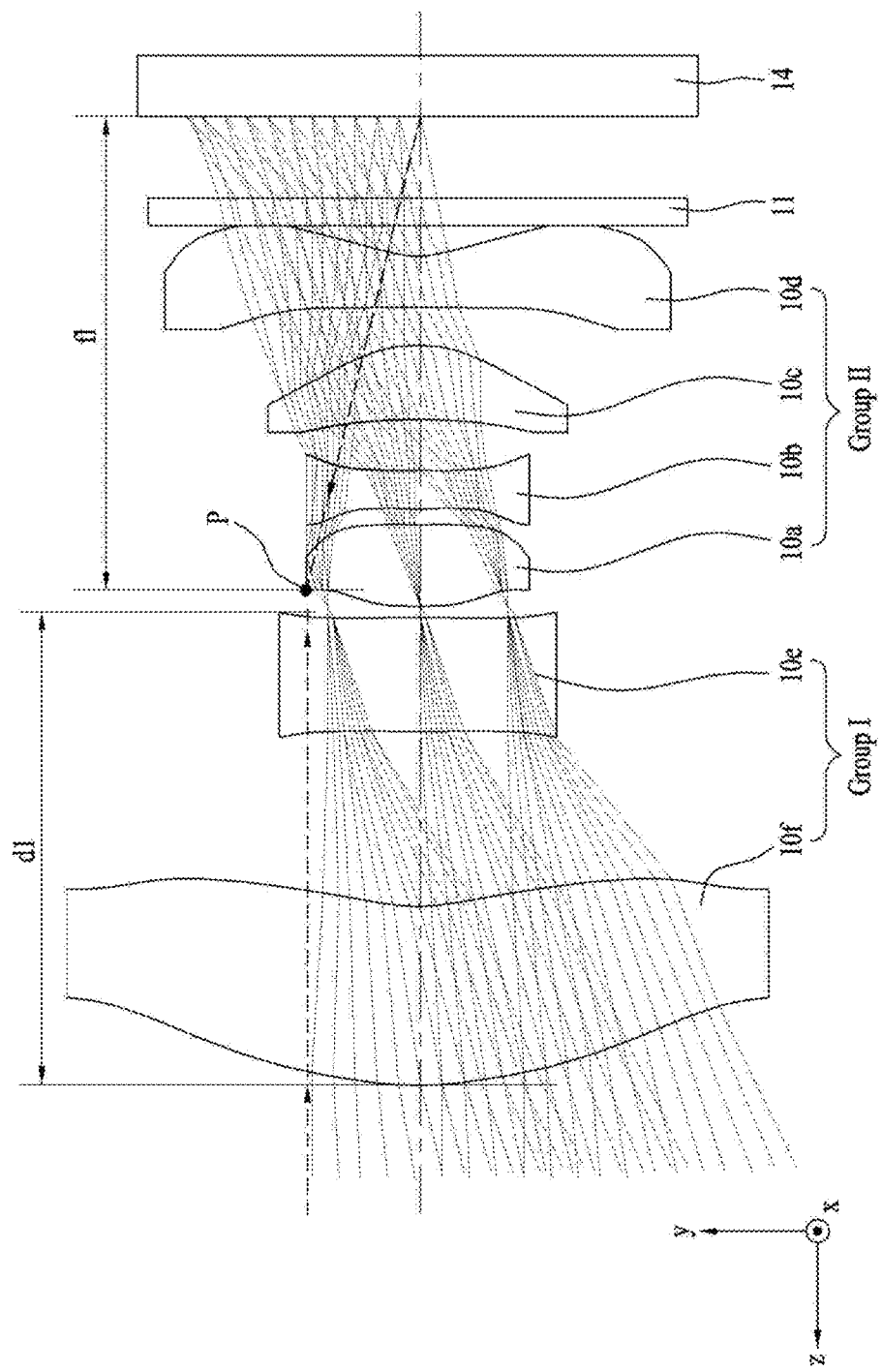
FIG. 3 is a view illustrating an imaging unit of an iris recognition camera in accordance with one embodiment.
Figure 4:
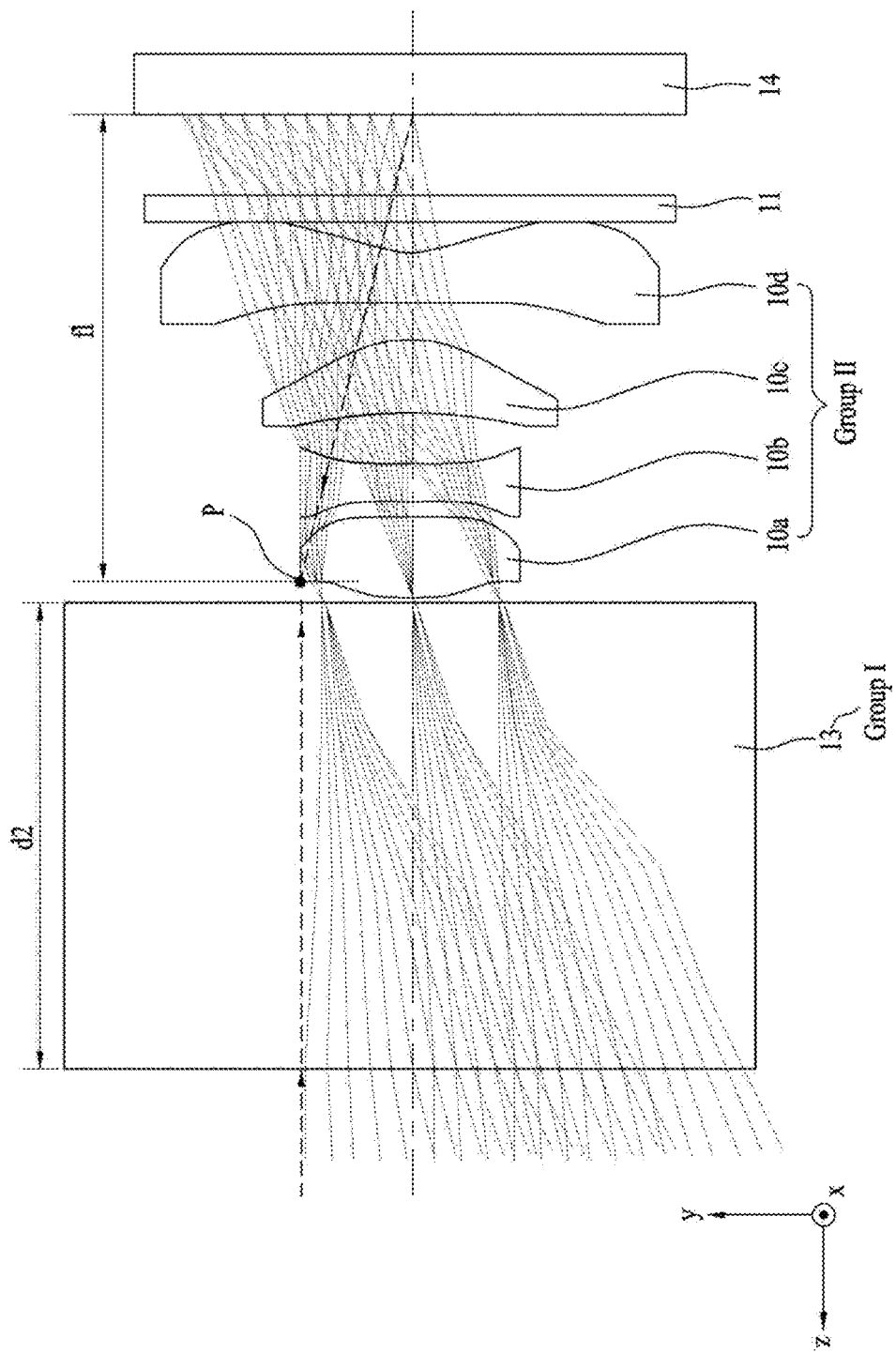
FIG. 4 is a view illustrating an imaging unit of an iris recognition camera in accordance with another embodiment.

FIG. 2 is a perspective view illustrating an iris recognition camera in accordance with the embodiment, FIG. 3 is a view illustrating an imaging unit of an iris recognition camera in accordance with one embodiment, and FIG. 4 is a view illustrating an imaging unit of an iris recognition camera in accordance with another embodiment.

With reference to FIG. 2, the imaging unit 110 may include an optical unit 10 which outputs optical information of a photographed iris, an image sensor 14 which converts the outputted optical information into an electrical signal, and an imaging unit body 12 which provides a space accommodating the optical unit 10 and the image sensor 14.

The optical unit 10 may include a plurality of lenses 10a-10f (in FIG. 3), and absorb light incident from the outside and then output the absorbed light to the image sensor 14 so as to obtain an image of a subject.

That is, the imaging unit 110 may output the optical information of the iris obtained from the optical unit 10 including the lenses, and transmit the optical information to the image sensor 14 so as to convert the optical information into an electrical signal, thus generating a photographed iris image.

The optical information outputted from the optical unit 10 may be transmitted to the image sensor 14.

The image sensor 14 may receive optical information of a subject incident through the lenses of the optical unit 10 and perform photoelectric conversion of the optical information into an electrical signal, and the image sensor 14 may be a Charge-Coupled Device (CCD) sensor or a Complementary Metal-Oxide-Semiconductor (CMOS) sensor.

The imaging unit 110 in accordance with the embodiment may include lenses having a fixed focal length, without being limited thereto, but have an autofocus function.

The iris recognition camera system 200 in accordance with the embodiment may include the display units 120, and at least one display unit 120 surrounding the imaging unit 110 may be arranged outside of the imaging unit.

The number of the lenses constituting the optical unit 10 is not limited, and one lens or a plurality of lenses may be arranged in the optical unit 10.

A plurality of lenses 10a to 10f may be sequentially stacked, and spacers (not shown) may be arranged among the lenses 10a to 10f. The spacers may space the lenses 10a to 10f apart from one another and thus maintain intervals among the lenses 10a to 10f.

The imaging unit body 12 may have a cylindrical or rectangular shape but is not limited thereto.

Further, at least one of the lenses 10a to 10f of the optical unit 10 may concentrate light onto the image sensor 14.

Here, the lenses 10a to 10f may refract incident light so as to attract a large amount of light from one point of the subject and to collect the attracted light onto one point.

Such light collected into one point may form one image and, if light is collected into one point of the image sensor 14 and thus one image is formed, it may be determined that the subject is located at a focal length.

As described above, on the assumption that resolution of a designated object is maintained in the iris recognition camera system, a recognition distance of an iris recognition camera may be determined by the size of a unit pixel of the sensor and the focal length of the lens.

For example, if the size of the unit pixel is 1.12 μm and the focal length of the lens is 4.0 mm, an object distance satisfying the above-described resolution of the designated object, i.e., 15.7 pixels/mm, may be 230 mm.

Therefore, one of physical methods to increase a distance at which an object may be recognized in the iris recognition camera system is to increase a focal length.

However, if a focal length is increased so as to increase a recognition distance of an object, the volume of the iris recognition camera system is increased.

For example, a camera module which is generally used in the iris recognition camera system may include a lens barrel and an optical unit including a plurality of lenses provided in the lens barrel and, if the size of the optical unit is increased to increase a focal length, the volume of the lens barrel accommodating the optical unit is increased.

Hereinafter, optical units 10 in accordance with embodiments in which a focal length is increased without increase in the size of the optical unit 10 will be described with reference to FIGS. 3 and 4.

With reference FIGS. 3 and 4, a distance from one surface of an image sensor 14 to a focal point P may be defined as a focal length fl.

The optical units 10 shown in FIGS. 3 and 4 may be the optical units 10 having the same focal length fl.

The optical unit 10 in accordance with the embodiment shown in FIG. 3 may include a group I including two lenses and a group II including four lenses arranged at the rear of the group I so as to implement the focal length fl.

Further, an optical block 11 may be arranged between the group II and the image sensor 14, and the optical block 11 may be an optical filter, such as a low pass filter (LPF) or an IR-cut filter, or a cover glass (CG) to protect an imaging surface of an imaging element.

For example, the group I may include a sixth lens 10f having positive refractive power and a fifth lens 10e having negative refractive power, which are arranged in order from an object side. However, the group I is not limited thereto and may include every combination constituting negative refractive power of the group I.

The sixth lens 10f may be a positive meniscus lens having a convex surface facing the object side, and the fifth lens 10e may be a negative lens having both concave surfaces.

Further, the group II may include a first lens 10a having positive refractive power, a second lens 10b having negative refractive power, a third lens 10c having positive refractive power and a fifth lens 10d having negative refractive power, which are arranged in order from the object side.

The first lens 10a, the third lens 10c and the fifth lens 10d may include at least one aspheric surface.

Since the first lens 10a, the third lens 10c and the fifth lens 10d include at least one aspheric surface, astigmatism which is aberration generated on an off-axis, curvature of an image field, etc. may be reduced.

As described above, in order to allow the optical unit 10 in accordance with the embodiment shown in FIG. 3 to increase a recognition distance of an object, the group I having a thickness corresponding to a first distance dl may be arranged in front of the group II.

The optical unit 10 in accordance with the embodiment shown in FIG. 4 may include a group I including an optical element 13 and a group II including four lenses arranged at the rear of the group I so as to implement the focal length fl.

Further, an optical block 11 may be arranged between the group II and the image sensor 14, and the optical block 11 may be an optical filter, such as a low pass filter (LPF) or an IR-cut filter, or a cover glass (CG) to protect an imaging surface of an imaging element.

For example, the group I may include the optical element 13 including no lens, and the optical element 13 may include a holographic optical element (HOE).

The holographic optical element means a kind of Diffractive Optical Element (DOE) which is manufactured using holography technology, and is produced to form a desired shape of transmitted or reflected light by reproducing or deforming waveforms recorded in a hologram.

The holographic optical element is an optical element which is not operated by the law of reflection or the law of refraction but is operated by the law of diffraction.

Further, the group II may include a first lens 10a having positive refractive power, a second lens 10b having positive refractive power, a third lens 10c having positive refractive power and a fifth lens 10d having positive refractive power, which are arranged in order from an object side.

The first lens 10a, the third lens 10c and the fifth lens 10d may include at least one aspheric surface.

Since the first lens 10a, the third lens 10c and the fifth lens 10d include at least one aspheric surface, astigmatism, which is aberration generated on an off-axis, curvature of an image field, etc. may be reduced.

However, the focal length fl may be implemented by arranging the group I in front of the group II but, thereby, the total thickness of the optical unit 10 of the earlier embodiment is increased by the first distance d1 and thus the total thickness of the optical unit 10 may be increased.

Therefore, as exemplarily shown in FIG. 4, the group I includes the optical element 13 having a second distance d2 smaller than the first distance d1 and, thus, an iris recognition camera system which may implement the same focal length fl as that of the optical unit 10 shown in FIG. 2 and does not greatly increase the total thickness of the optical unit 10, and a terminal including the same may be provided.

For example, as exemplarily shown in FIGS. 3 and 4, the first distance d1 shown in FIG. 3, determining the thickness of the optical unit 10 of the embodiment implementing the same focal length fl, is several mm, because the group I includes a plurality of lenses. On the other hand, the second distance d2 shown in FIG. 4 may be designed to be less than 1 mm, because the group I includes one HOE instead of a plurality of lenses. Particularly, the second distance d2 may be 0.3 mm or less.

However, these values are only to easily describe one embodiment, and the first distance d1 and the second distance d2 may be variously modified to meet user needs and do not limit the scope of the disclosure.

Figure 5:
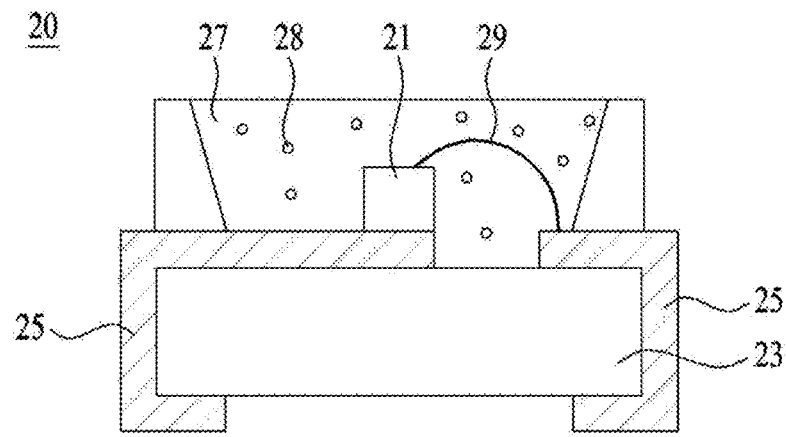
FIG. 5 is a view illustrating a light emitting module in accordance with one embodiment.

FIG. 5 is a view illustrating a light emitting module 20 in accordance with one embodiment, the light emitting module 20 in accordance with the embodiment may include a body 23, a cavity 27 formed in the body and a light emitting element 21 arranged in the cavity, and the body may include lead frames 25 conductively connected to the light emitting element 21.

The body 23 may be formed of a silicon material, a synthetic resin material or a metal material and be provided with the cavity 27 having an opening formed through an upper part thereof and including side surfaces and a bottom surface.

The body 23 may include at least one lead frame 25 and thus be conductively connected to the light emitting element 21. Here, the light emitting element 21 may be conductively connected to one of a pair of lead frames 25 through direct contact, and be conductively connected to the other through a wire 29.

At least one light emitting element 21 may be arranged on the bottom surface of the cavity 27.

A molding part surrounding the light emitting element 21 may be formed in the cavity 27 of the light emitting module. The molding part may include a resin layer and phosphors 28.

The light emitting element 21 may include a first conductivity-type semiconductor layer, an active layer and a second conductivity-type semiconductor layer, and emit light of different wavelengths according to composition of the semiconductor layers.

For example, the light emitting element 21 may emit blue light and, if the molding part including the phosphors 28 is formed in the cavity 27, the wavelength of light emitted by the light emitting element 21 may be varied according to kinds of the phosphors.

For example, the light emitting module 20 may emit light of a designated wavelength, such as red, yellow or white light, according to the light emitting element and the phosphors which are excited by light emitted by the light emitting element to convert the wavelength of light.

Figure 6:
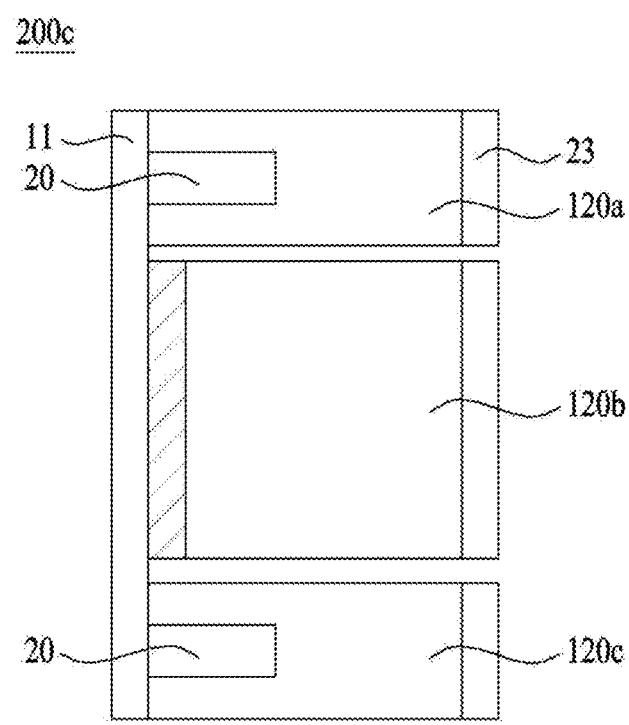
FIG. 6 is a view illustrating an iris recognition camera system in accordance with one embodiment.

FIG. 6 is a view illustrating an iris recognition camera system in accordance with one embodiment and, more particularly, a schematic side view of an iris recognition camera system 200c.

With reference to FIGS. 9(a)-9(d), an imaging unit 110 may be arranged at the center of the iris recognition camera system 200c, and a plurality of display units 120a, 120b, 120c and 120d may be arranged at the outside of the imaging unit 110 so as to surround the imaging unit 110.

The display units 120a to 120d may be arranged so as to be spaced apart from one another without being limited thereto, and be arranged so as to be adjacent to one another.

For example, in the iris recognition camera system 200c in accordance with the embodiment shown in FIG. 6, four display units 120a to 120d may be arranged around the imaging unit 110, and the display units 120a to 120d may be respectively arranged at upper, lower, left and right sides of the imaging unit 110.

When the display units are arranged at the upper, lower, left and right sides of the imaging unit 110, the display units 120a and 120c arranged at the upper and lower sides of the imaging unit 110 may be arranged so as to be opposite to each other with the imaging unit 110 interposed therebetween.

Further, the display units 120b and 120d arranged at the left and right sides of the imaging unit 110 may be arranged so as to be opposite to each other with the imaging unit 110 interposed therebetween.

Although the embodiment shown in FIGS. 9(a)-9(d) illustrate the display units 120a to 120d as being arranged at the upper, lower, left and right sides of the imaging unit 110, the embodiment is not limited thereto and a plurality of display units may be arranged in diagonal directions so as to surround the imaging unit 110.

If the display units are arranged in the diagonal directions, two display units being opposite to each other may be arranged so as to be symmetrical to each other about the imaging unit 110.

Further, although FIGS. 9(a)-9(d) illustrate the four display units 120a to 120d, the number of display units is not limited thereto and, for example, five or more display units may be arranged so as to surround the imaging unit 110.

Each of the display units 120a to 120d may include at least one light emitting module 20.

That is, each of the display units 120a to 120d may include one light emitting module 20 or a plurality of light emitting modules 20. Here, the light emitting modules 20 may be arranged at upper, lower, left and right sides of the imaging unit 110 so as to surround the imaging unit 110.

Each display unit may include a plurality of light emitting modules 20 which emit light of the same wavelength, or each display unit may include a plurality of light emitting modules which emit light of different wavelengths.

The display units 120a to 120d may respectively have separate driving units, and the respective display units may emit light of different wavelength regions.

With reference to FIG. 6, the display units 120a and 120c surrounding the imaging unit 110 may include the light emitting module 20, a substrate 11 supporting the light emitting module, and a front cover 23 protecting the light emitting module.

The substrate 11 may be a PCB to drive the light emitting module. The substrate 11 may be conductively connected to the light emitting module 20 and be connected to an external electrode.

For example, the PCB may be a hard type to support the light emitting module without being limited thereto, or be a flexible type.

The front cover 23 may be formed of a transparent material, such as plastic or glass, without being limited thereto, and a diffusion plate to uniformly diffuse light emitted by the light emitting module 20 may be further provided.

Although FIGS. 5, 6 and 9 exemplarily illustrate arrangement of the display units, the arrangement or number of the display units in the iris recognition camera system is not limited thereto and display units having various shapes may be arranged.

Further, the number of the display units may be greater or smaller than that of the embodiment shown in the figures, and the areas of the respective display units may be equal or different.

Hereinafter, an iris recognition method using the above-described iris recognition camera system 200 and a mobile terminal including the same will be described, but the embodiment is not limited thereto and the iris recognition camera system in accordance with the embodiment may be used for various purposes to photograph an iris.

Figure 7:
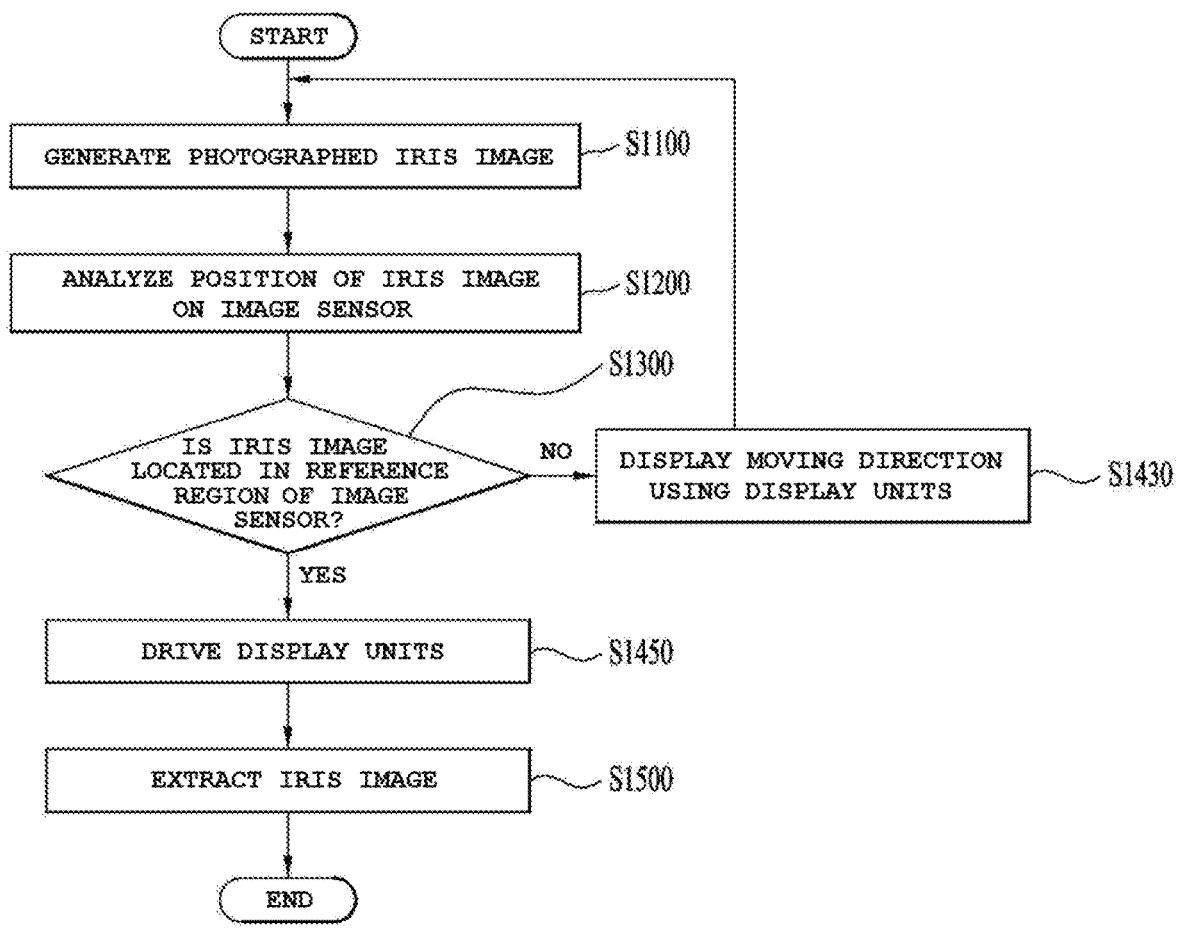
FIG. 7 is a flowchart illustrating an iris recognition method in accordance with one embodiment.

FIG. 7 is a flowchart illustrating an iris recognition method in accordance with one embodiment.

The iris recognition method using the iris recognition camera system in accordance with the above-described embodiment may include generating a photographed iris image (Operation S1100), analyzing a position of the photographed iris image on the image sensor (Operation S1200), and driving the display units according to an analyzed position result vale (Operations S1430 and 1450).

In the iris recognition method in accordance with the embodiment, generation of the photographed iris image (Operation S1100) may include obtaining optical information by photographing an iris and converting the obtained optical information into an electrical signal, i.e., processing image information.

In obtaining of the optical information by photographing the iris, the imaging unit of the iris recognition camera system may generate an optical signal of an iris image.

Further, in processing of the image information, the image sensor may receive the optical signal generated by photographing the iris and perform photoelectric conversion of the optical signal into an electrical signal. The image sensor may obtain the photographed iris image by performing photoelectric conversion of the optical signal into the electrical signal.

In the iris recognition method in accordance with the embodiment, in analysis of the position of the photographed iris image on the image sensor (Operation S1200), the position of the photographed iris image on the image sensor may be calculated.

Further, analysis of the position of the photographed iris image on the image sensor (Operation S1200) may include determining whether or not the photographed iris image is located in a reference region of the image sensor (Operation S1300).

In analysis of the position of the photographed iris image on the image sensor (Operation S1200), a region at which the photographed iris image is located based on the reference region of the image sensor may be determined, and analysis of the position of the photographed iris image on the image sensor (Operation S1200) may include determining whether or not the photographed iris image is formed in the reference region of the image sensor (Operation S1300).

In the iris recognition method in accordance with the embodiment, determination of the position of the photographed iris image on the image sensor (Operation S1200) may be performed by the calculation unit of the iris recognition camera system.

The calculation unit may analyze and determine the position of the photographed iris image and determine a moving direction of the iris according to a result value. Further, the calculation unit may transmit a signal, regarding the result value of determination as to whether or not the photographed iris image is located in the reference region of the image sensor, to the display units so that the display units may be driven.

Further, whether or not the obtained iris image is located in the reference region on the image sensor may be determined by dividing the image sensor into virtual regions.

The reference region may be a virtual optical field including the center of the image sensor.

For example, the reference region on the image sensor to detect a relative position of the iris image may be an optical field having a concentric shape around the center of the image sensor.

Figure 8:
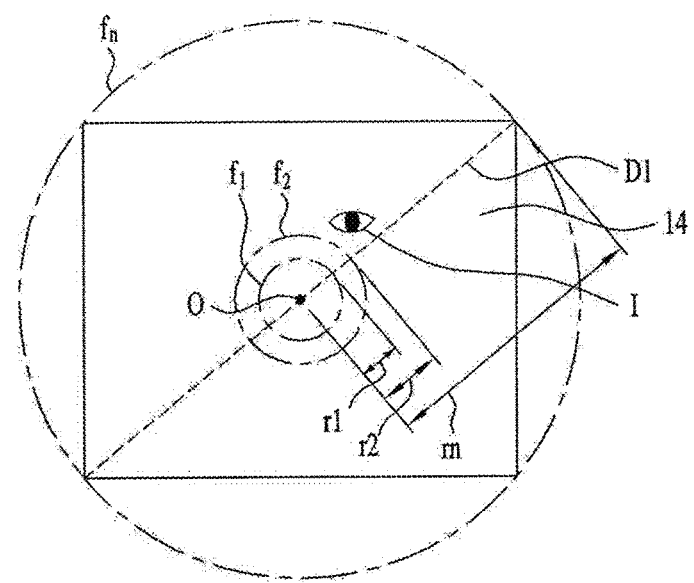
FIG. 8 is a view illustrating an image sensor on which a photographed iris image is formed, in accordance with one embodiment.

FIG. 8 is a view illustrating an image sensor on which a photographed iris image is formed, in accordance with one embodiment.

With reference to FIG. 8, the image sensor 14 in accordance with the embodiment may be divided into n optical fields $f_1, f_2, \ldots f_n$. Virtual circles to discriminate the n optical fields may be concentric circles using a central point O of the image sensor as the center.

The optical fields which are virtual regions of the image sensor 14 may be regions, when a diagonal line D1 of the image sensor is divided at regular intervals, which may be divided from one another by virtual concentric circles, each of which has a diameter corresponding to an interval between two points on the diagonal line, being symmetrical to each other about the center O of the image sensor.

For example, the first optical field $f_1$ may be the inner region of a virtual circle which has a radius corresponding to a distance from the center O of the image sensor to a point spaced apart from the center O by r1.

Further, the second optical field $f_2$ may be a region obtained by excluding the inner region of the virtual circle corresponding to the first optical field $f_1$ from the inner region of a virtual circle which has a radius corresponding to a distance from the center O of the image sensor to a point spaced apart from the center O by r2.

The number of the divided optical fields may be varied according to the size of the image sensor and the purpose of use of an image obtained through the image sensor.

For example, if the image sensor is divided into 10 optical fields, it may be determined that, when an iris image is formed in the first optical field $f_1$, the iris image is located in the reference region of the image sensor.

On the other hand, it may be determined that, when the iris image deviates from the first optical field $f_1$, the photographed iris image is not formed in the reference region, and then a direction in which the iris image deviates from the first optical field $f_1$ based on the center of the image sensor may be determined.

Further, if the photographed iris image is located in the reference region, the center of the iris in the photographed iris image I and the center O of the image sensor may coincide with each other.

In FIG. 8, the formed iris image I deviates from the first optical field $f_1$ and is located at the upper region of the right side from the center O of the image sensor and, thus, in order to obtain an accurate iris image, an eye should be moved left and down from the current position of the obtained iris image.

For example, iris movement in a direction in which the center of the iris image I and the center O of the image sensor coincide with each other is required.

The iris recognition method in accordance with the embodiment may include, after analysis of the obtained position of the iris image, as described above, correspondingly driving the display units (Operation S1430 and S1450).

If it is analyzed that the photographed iris image deviates from the reference region of the image sensor, an iris moving direction is displayed by driving the display unit (Operation S1430).

In display of the moving direction by driving the display unit (Operation S1430), the iris recognition camera system may inform a user of the moving direction by driving the display unit.

For example, FIGS. 9(a)-9(d) are views illustrating a moving direction of an iris in accordance with one embodiment in the iris recognition method using the iris recognition camera system having the four display units 120a, 120b, 120c and 120d.

Figure 9A:
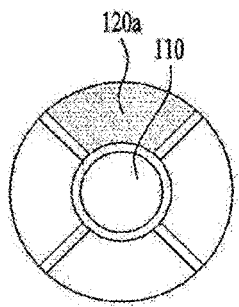
FIGS. 9(a)-9(d) are views illustrating a moving direction of an iris in accordance with one embodiment in the iris recognition method using the iris recognition camera system.

FIG. 9(a) illustrates a case that the display unit 120a arranged at the upper side of the imaging unit 110 is driven. FIG. 9(a) illustrates a case that a photographed iris image is located at the lower end of the reference region of the image sensor and, in display of the moving direction by driving the display unit (Operation S1430), the display unit 120 arranged at the upper side of the imaging unit 110 may be driven and thus guide a user to move his/her iris up.

Figure 9B:
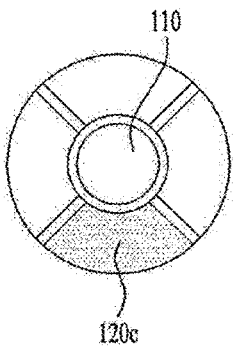
Figure 9C:
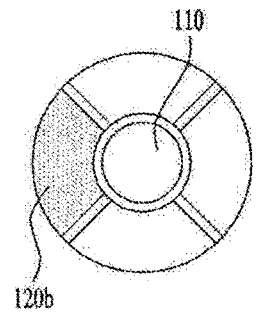
Figure 9D:
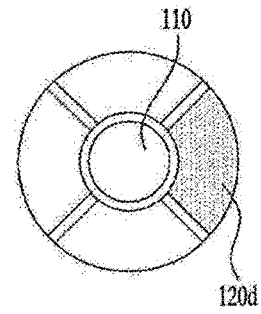

In the same manner, FIGS. 9(b), 9(c) and 9(d) may illustrate driving of the corresponding display unit so as to move the iris down, left and right, respectively.

Further, although not shown in the drawings, a plurality of display units may be simultaneously driven according to a position analysis result of the obtained iris image.

For example, if the obtained iris image deviates from the reference region of the image sensor and is formed at the upper region of the right side from the center O of the image sensor, as exemplarily shown in FIG. 8, the display units 120b and 120c arranged at the left and lower sides of the imaging unit 110 may be simultaneously operated so as to guide a user to move his/her iris in the leftward and downward directions.

However, the display units are not limited to the above-described driving method shown in FIGS. 9(a)-9(d), and the driving method of the display units may be varied according to the number of the display units arranged at the outside of the imaging unit 110, the shape of the display units, etc.

Further, the driving method of the display units may be varied according to an algorithm used in the iris recognition method in accordance with the embodiment. For example, through driving of at least one display unit, the moving direction of the iris is not displayed but a relative position of the photographed iris image to the reference region may be displayed.

When the moving direction of the iris is displayed through the display units, the user may move his/her iris in the instructed moving direction and thereafter the imaging unit may generate again an iris image (Operation S1100).

On the other hand, if it is determined that the generated photographed iris image is located in the reference region of the image sensor, the formed iris image may be extracted as an authenticated iris image (Operation S1500).

Further, the authenticated iris image may be compared to a reference iris image stored in the memory unit of the iris recognition camera system.

Extraction of the authenticated iris image may be datarization of an iris characteristic pattern from the obtained iris image using an image processing technique. Further, comparison of the authenticated iris image to the reference iris image may be authentication of the user by comparing the extracted authenticated iris image data to pattern data of a reference iris which is registered in advance.

If the photographed iris image is located in the reference region, driving of the display units (Operation S1450) may be driving of at least one display unit so as to be flickered.

For example, in driving of the display units (Operation S1450), the user may be informed that the iris is located in the reference region and thus a final iris image for authentication will be obtained, by flickering all the display units arranged at the outside of the imaging unit or driving the display units for a designated time.

Further, flickering of the display units may serve to provide light to the iris prior to extraction of the authenticated iris image and thus to inhibit red eye effects when the iris is photographed.

For example, in order to notify obtaining of the final iris image in the embodiment, all the display units may be flickered or the display units may be driven for a designated time without being limited thereto, or obtaining of the final iris image may be notified through a pre-stored notification sound.

In the iris recognition camera system in accordance with the above-described embodiment and the iris recognition method using the same, a photographed iris image is not confirmed through a separate display but a relative position of the iris image may be detected through driving of the display units, and, thus, an iris moving direction may be easily suggested to a user and iris recognition may be effectively performed by easily and accurately obtaining the iris image.

Figure 10:
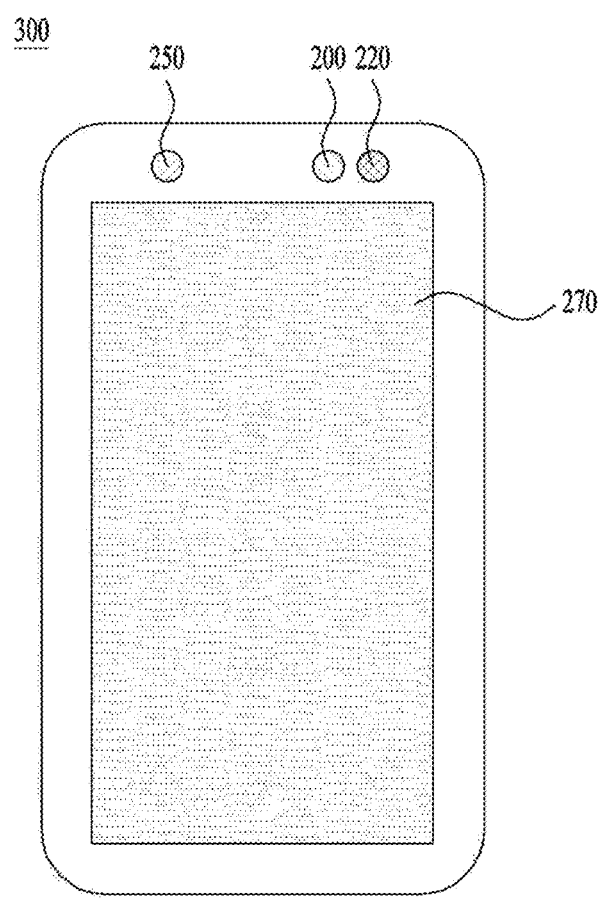
FIG. 10 is a view illustrating a mobile terminal in accordance with one embodiment.

FIG. 10 is a view illustrating a mobile terminal in accordance with one embodiment. The mobile terminal in accordance with the embodiment may include the iris recognition camera system in accordance with the above-described embodiment.

The iris recognition camera system maybe arranged on the front surface or the rear surface of the terminal.

For example, although the terminal including the iris recognition camera system may be a mobile terminal, the embodiment is not limited thereto and the iris recognition camera system in accordance with the above-described embodiment may be provided to a stationary terminal.

FIG. 10 is a schematic front view of a mobile terminal in accordance with one embodiment.

The mobile terminal 300 may further include a camera system 220 for general image capture, in addition to the iris recognition camera system 200 in accordance with the above-described embodiment.

Further, the mobile terminal may further include an infrared light emitting module 250 as a lighting module for iris photographing.

The infrared light emitting module 250 may include light emitting diodes which emit infrared light.

An iris image obtained by the iris recognition camera system 200 may be displayed through a display unit 270 of the mobile terminal.

Further, the iris image obtained using the iris recognition camera system 200 may be provided so as to be used for other functions of the mobile terminal, for example, used in a security system of the mobile terminal, without being limited thereto.

In case of iris recognition using the mobile terminal, data information of a reference iris image may be stored in a memory of the mobile terminal.

The mobile terminal in accordance with the embodiment includes the iris recognition camera system so that a mobile device may use a security system using iris recognition, and easily detects the position of an iris through driving of the display units and may thus accurately and rapidly perform iris authentication.

Figure 11:
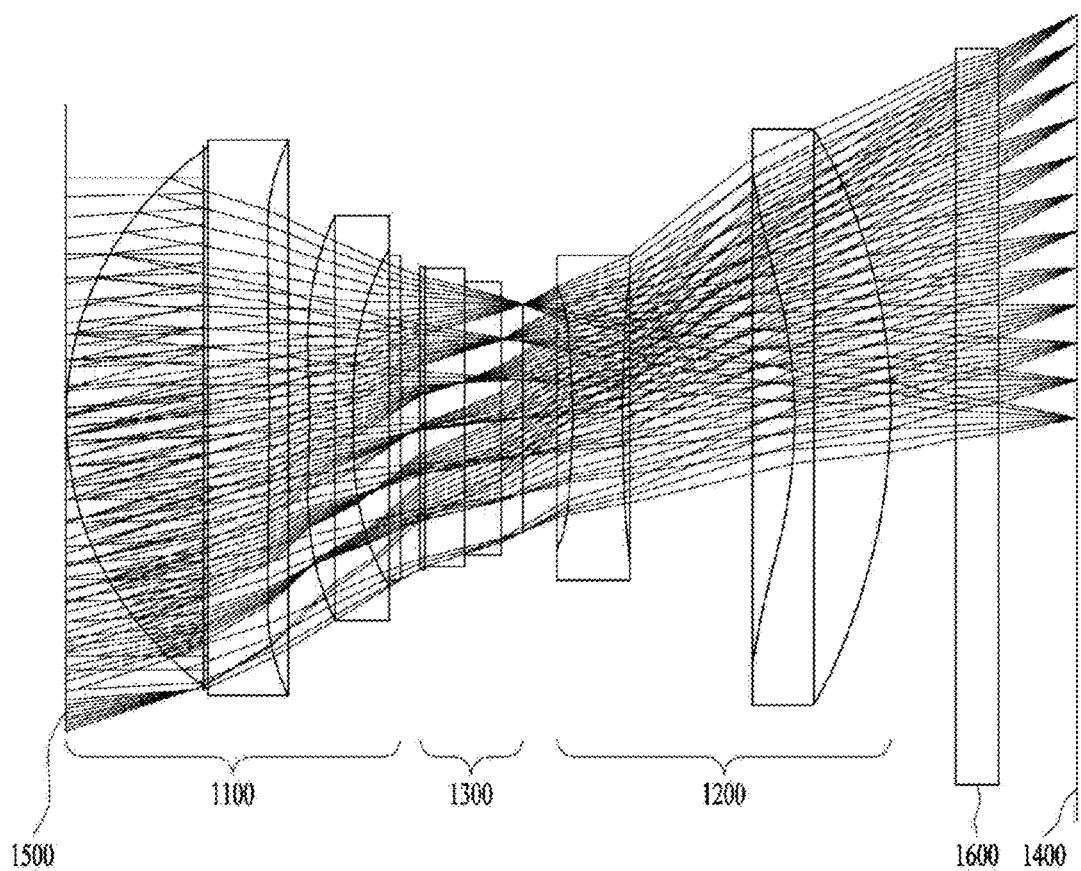
FIG. 11 is a schematic view illustrating a lens module in accordance with one embodiment.

FIG. 11 is a schematic view illustrating a lens module in accordance with one embodiment. The lens module in accordance with the embodiment may include a first lens unit 1100, a second lens unit 120, a variable lens unit 1300, a first transmissive plate 1500, a second transmissive plate 1600 and a control unit 1700.

The first lens unit 1100 may be provided at a front part of incident light, and the second lens unit 1200 may be provided at a rear part of the incident light. The first lens unit 1100 may include at least one lens. Further, the first lens unit 1100 may form an optical system in which a plurality of lenses is aligned in the first direction, i.e., in an optical axis direction, as exemplarily shown in FIG. 11.

The second lens unit 1200 may be provided so as to be opposite to the first lens unit 1100 and to be spaced apart from the first lens unit 1100 in the first direction corresponding to the optical axis direction, and include at least one lens. The second lens unit 1200 may form an optical system in which a plurality of lenses is aligned in the first direction, in the same manner as the first lens unit 1100.

The variable lens unit 1300 may be arranged between the first lens unit 1100 and the second lens unit 1200 and serve to control a focal length of the lens module. The variable lens unit 1300 may include at least one lens, and form an optical system in which a plurality of lenses is aligned in the first direction, in the same manner as the first lens unit 1100.

The variable lens unit 1300 may serve to suppress change in focal length according to change in the temperature of the lens module. Further, the variable lens unit 1300 may serve to suppress change in magnification according to change in the focal length of the lens module.

The lens module in accordance with the embodiment may not be used in, for example, the iris recognition camera module. The iris recognition camera module may be provided such that there is no magnification change or small magnification change of a subject.

The reason for this is that, if there is excessive magnification change of a subject in the iris recognition camera module, it is difficult to accurately and precisely recognize a human iris. Therefore, when magnification change exceeding a set value occurs, the iris recognition camera module cannot be certified and thus it is impossible to sell the iris recognition camera module in the market.

Therefore, it is necessary to control the lens module used in the iris recognition camera module such that, even if external environments are changed, magnification change in the lens module does not exceed a set value.

Magnification change in the lens module directly relates to change in focal length. That is, when the focal length of the lens module is changed, the magnification of a subject may be changed. On the other hand, if the focal length deviates from a set value, quality including sharpness of a photographed subject may be lowered.

If the focal length deviates from the set value, the magnification of the subject may be changed and simultaneously quality of the photographed subject may be lowered. Therefore, when the magnification of the subject is changed due to change in the focal length in the iris recognition camera module, quality of the photographed iris may be lowered and, thus, the iris recognition performance of the iris recognition camera module may be lowered and the iris recognition camera module may not function properly.

In the embodiment, particularly, as an ambient temperature of the lens module and the iris recognition camera module including the same are changed, change in the magnification of the subject due to change in the focal length of the lens module may be effectively suppressed, thereby inhibiting lowering of performance of the lens module and the camera module.

The variable lens unit 1300 in accordance with the embodiment may be provided to control the focal length of the lens module by controlling diopter which is the reciprocal of the focal length of the lens module.

For example, as a method by which the variable lens unit 1300 controls the diopter of the lens module 1300, the variable lens unit 1300 may be moved so as to control the diopter. That is, the variable lens unit 1300 may be moved in the first direction to compensate for change in the diopter of the lens module according to temperature change, and thus control the diopter of the lens module.

For example, if the diopter of the lens module is changed to a positive value according to temperature change, the variable lens unit 1300 may be moved in the first direction and thus change the diopter of the lens module to a negative value having the same absolute value as the changed diopter value so as to offset change in the diopter of the lens module, thereby maintaining an original diopter value.

Although not shown in the drawings, the lens module or the camera module may be provided with a driving device to move the variable lens unit 1300 in the first direction, and operation of the driving device may be controlled by the control unit 1700, which will be described later.

In another embodiment, as a method by which the variable lens unit 1300 controls the diopter of the lens module 1300, the variable lens unit 1300 may control a refractive index so as to control the diopter of the lens module.

That is, the variable lens unit 1300 may include at least one refractive index variable lens and control the refractive index of the refractive index variable lens so as to control the diopter of the lens module.

The refractive index variable lens may be provided such that the refractive index of the refractive index variable lens is changed by an electrical signal applied thereto. The refractive index variable lens may be, for example, a liquid lens in which the inside of a deformable thin membrane is filled with a light-transmitting liquid.

When an electrical signal is applied to the liquid lens, curvature of the surface of the liquid lens is changed, refractive index of the liquid lens is changed according to change in the curvature of the surface and, thus, the diopter of the lens module may be changed.

Here, the variable lens unit 1300 may be provided with a driving device which changes the curvature of the surface of the liquid lens by an electrical signal applied thereto, and operation of the driving device may be controlled by the control unit 1700, which will be described later.

Here, the driving device may be a piezoelectric element. That is, the refractive index variable lens may be provided such that the refractive index of the refractive index variable lens is controlled by the piezoelectric element.

For example, if the refractive index variable lens is a liquid lens, a piezoelectric element may be disposed at a part of the surface of the liquid lens. When an electrical signal is applied to the piezoelectric element, the piezoelectric element is deformed and thereby the curvature of the liquid lens may be changed.

The refractive index variable lens may be operated such that the diopter of the lens module is controlled by change in the refractive index of the liquid lens according to change in the curvature of the liquid lens by operation of the piezoelectric element. In the same manner, operation of the piezoelectric element may be controlled by the control unit 170, which will be described later.

Further, the iris recognition camera module including the lens module in accordance with the embodiment may include an image sensor 1400. Light incident upon the camera module through the lens module reaches the image sensor 1400 and, thus, an image of a subject is formed on the image sensor 1400.

The image sensor 1400 may be may be arranged at the rear of the second lens unit 1200 in the proceeding direction of incident light so as to be opposite to the second lens unit 1200 and to be spaced apart from the second lens unit 1200 in the first direction, as exemplarily shown in FIG. 11.

The image sensor 1400 is a region which incident light passed through the first lens unit 1100, the variable lens unit 1300 and the second lens unit 1200 reaches and, thereby, an image of a subject, i.e., an iris, may be formed on the image sensor 1400. The image of the iris, photographed by the iris recognition camera module, may be used to identify a user.

The first transmissive plate 1500 is arranged in front of the first lens unit 1100, as seen from the first direction, and the first transmissive plate 1500 is a region upon which light is incident. Therefore, incident light may be incident upon the first lens unit 1100 of the lens module through the first transmissive plate 1500.

The second transmissive plate 1600 is arranged at the rear of the second lens unit 1200 and in front of the image sensor 1400, as seen from the first direction. Therefore, light incident upon the lens module may exit the lens module through the second transmissive plate 1600 and then be incident upon the image sensor 1400.

The control unit 1700 may serve to control the diopter of the variable lent unit 1300. Hereinafter, the structure, function and operation of the control unit 1700 will be described in detail with reference to FIG. 12.

Figure 12:
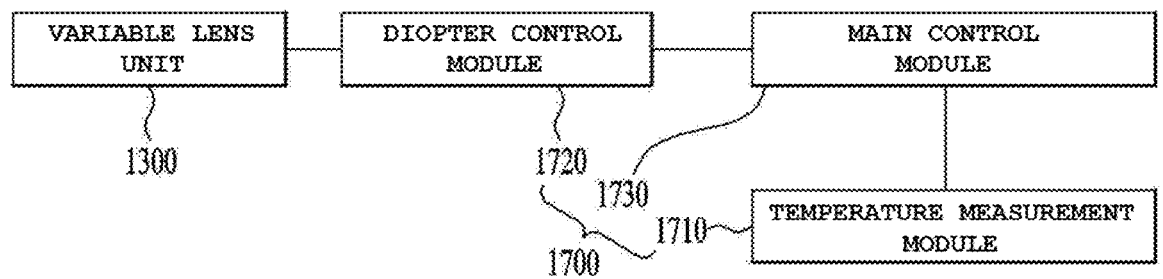
FIG. 12 is a block diagram illustrating a control unit provided in the lens module in accordance with the embodiment.

FIG. 12 is a block diagram illustrating the control unit 1700 provided in the lens module in accordance with the embodiment. As exemplarily shown in FIG. 12, the control unit 1700 may include a temperature measurement unit 1710, a diopter control module 1720 and a main control module 1730.

The temperature measurement unit 1710 may serve to measure a temperature of the lens module and/or an ambient temperature around the lens module. The temperature measurement unit 1710 may be arranged at a position close to the lens module.

Further, since the temperature measured by the temperature measurement unit 1710 may be converted into an electrical signal and the electrical signal is transmitted to the control unit 1700, the temperature measurement unit 1710 may use, for example, a thermocouple. However, in addition to the thermocouple, other temperature measurement units which may convert a measured temperature into an electrical signal may be used.

The diopter control module 1720 may be connected to the variable lens unit 130 and serve to control operation of the variable lens unit 130 so as to control the diopter of the lens module. The diopter control module 1720 may be connected to the main control module 1730 and thus receive a control signal transmitted from the main control module 170 and control operation of the variable lens unit 1300 according to the received control signal.

The variable lens unit 1300 may receive the control signal transmitted from the diopter control module 1720 and thus control diopter change of the lens module. As described above, the variable lens unit 1300 may suppress diopter change of the lens module by compensating for diopter change of the lens module according to temperature change.

The main control module 1730 may be connected to the temperature measurement module 1710 and the diopter control module 1720. The main control module 1730 may receive information regarding temperature transmitted from the temperature measurement module 1710 and transmit a control signal to the diopter control module 1720.

The main control module 1730 may receive temperature information measured by the temperature measurement module 170 and select a control value of the variable lens unit 1300 corresponding to the received temperature information. The main control module 1730 may transmit a control signal including information regarding the selected control value to the diopter control module 1720.

The control unit 1700 may perform control to persistently suppress diopter change of the lens module according to persistent change in ambient temperature of the lens module through feedback control.

Figure 13:
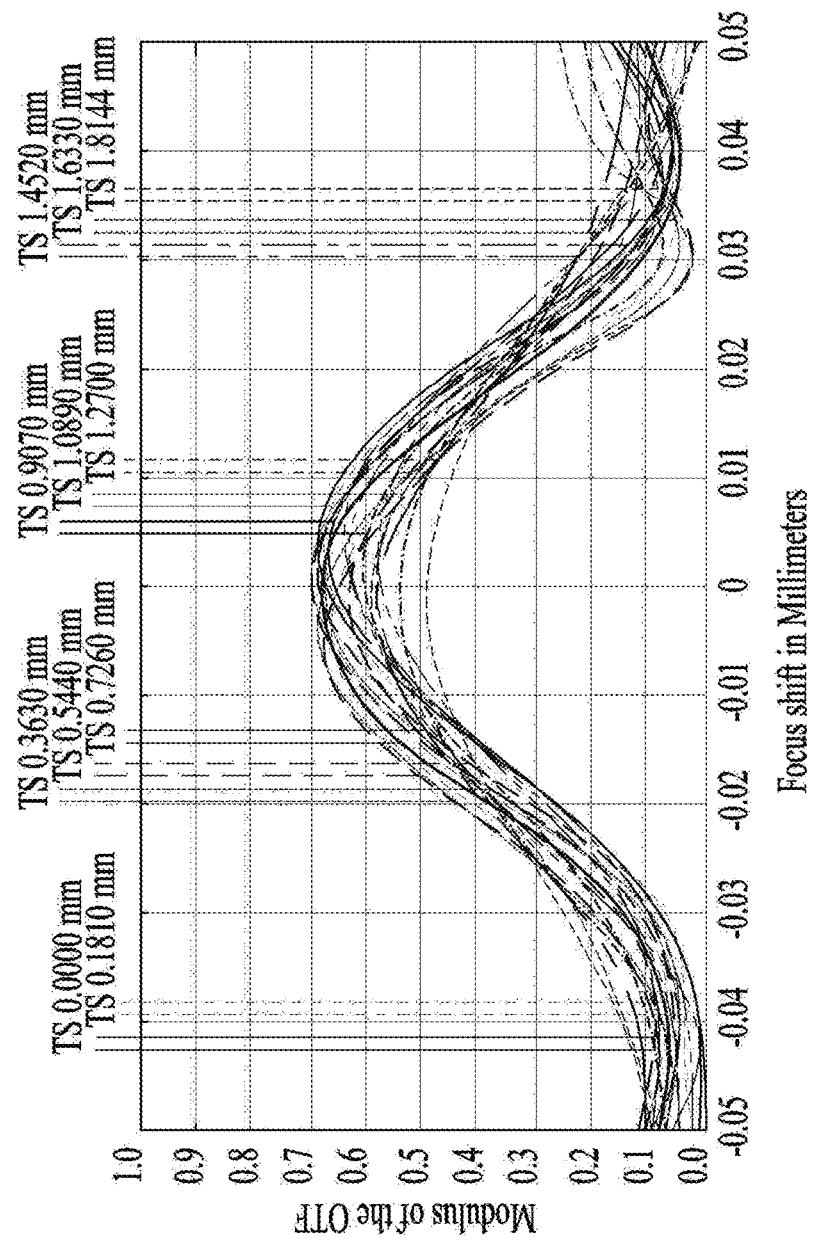
FIGS. 13 to 15 are graphs illustrating operating characteristics of a lens module provided with no variable lens unit.
Figure 14:
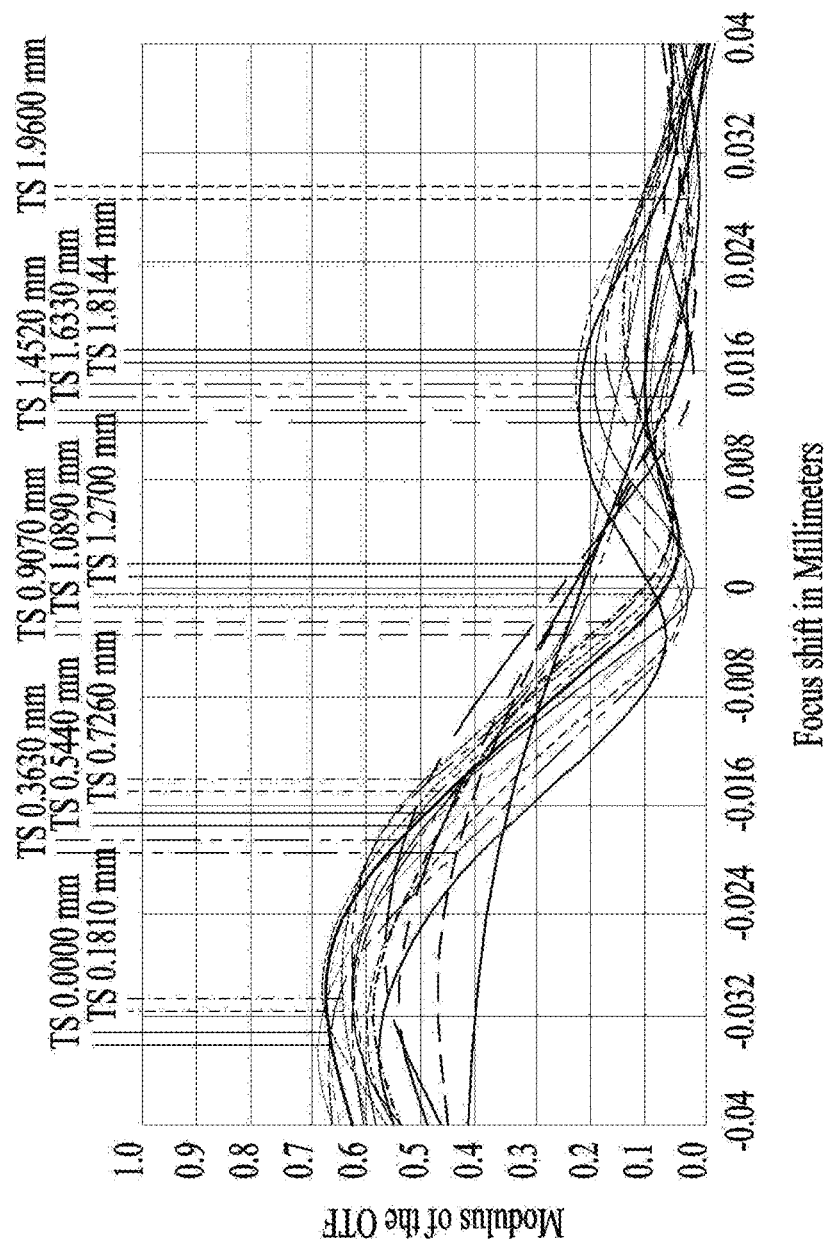
Figure 15:
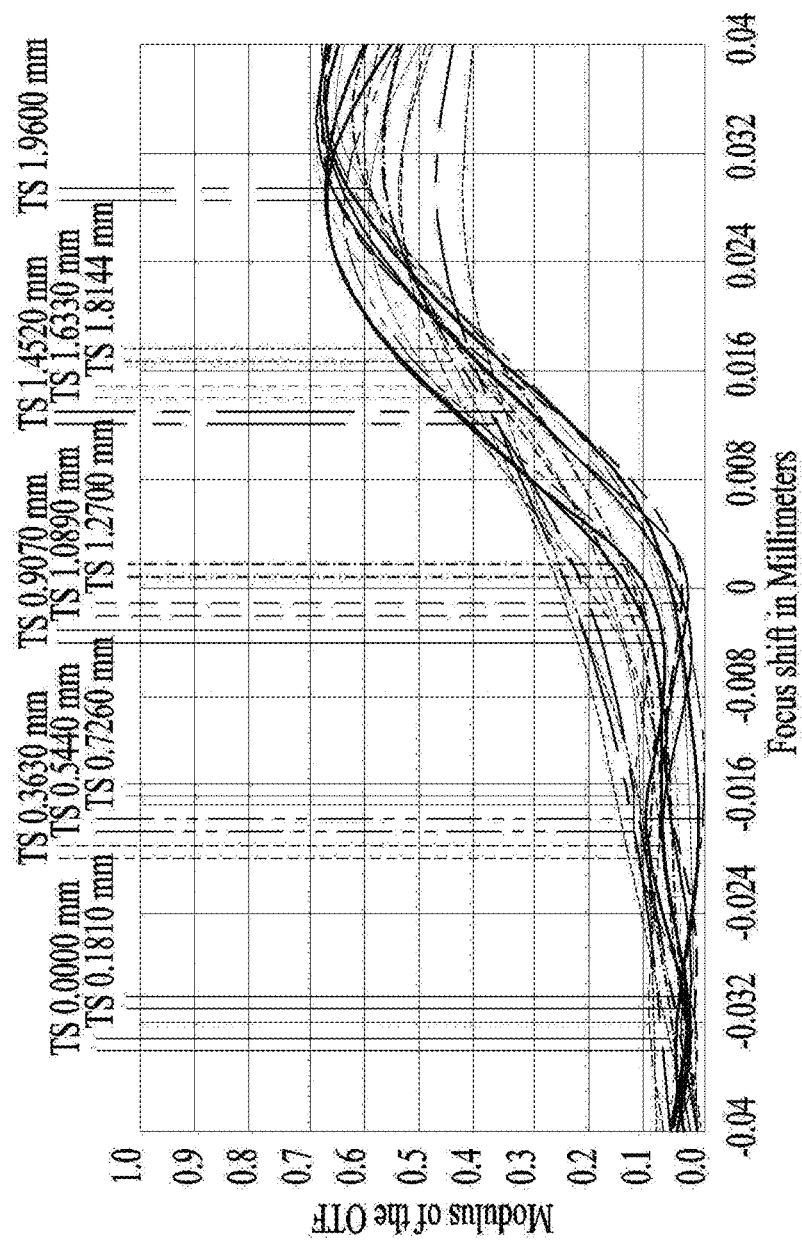

FIGS. 13 to 15 are graphs illustrating operating characteristics of a lens module provided with no variable lens unit 1300. A plurality of curves shown in the graphs are curves representing optical characteristics, i.e., characteristics of visible rays having different wavelengths incident upon the lens module. The same applies to the graphs of FIGS. 16 to 18.

In FIGS. 13 to 15, a horizontal axis represents change values of a focal length. The lens module at a position marked as "0" is located at a focal length from a subject. If a change value is a negative value, the lens module is located at a position apart from the subject farther than the focal length and, if the change value is a positive value, the lens module is located at a position apart from the subject closer than the focal length. The same applies to the graphs of FIGS. 16 to 18.

In FIGS. 13 to 15, a vertical axis represents moduli of an Optical Transfer Function (OTF). The same applies to the graphs of FIGS. 16 to 18.

The OTF is a criterion representing imaging performance of an optical system formed by lenses. For example, as an OTF modulus is increased, quality including sharpness of an image formed on the image sensor 1400 via the lens module is improved.

FIG. 13 represents a case that an ambient temperature around the lens module is about 25° C. Under the temperature condition of about 25° C., as exemplarily shown in FIG. 13, if a subject is located at the focal length of the lens module, the OTF modulus is highest and, thus, quality of an image is greatest.

The reason for this is that the lens module is designed so as to have the optimized performance under the temperature condition of about 25° C. However, when the temperature condition of the lens module is changed, if the subject is located at the focal length of the lens module, quality of an image is lowered. This will be described with reference to FIGS. 14 and 15.

FIG. 14 represents a case that the ambient temperature around the lens module is about 5° C. Under the temperature condition of about 5° C., if a subject is located at a position apart from the lens module closer than the focal length of the design criterion condition of the lens module, quality of an image is good. This may mean that the focal length is decreased as the ambient temperature is lowered.

FIG. 15 represents a case that the ambient temperature around the lens module is about 45° C. Under the temperature condition of about 45° C., if a subject is located at a position apart from the lens module farther than the focal length of the design criterion condition of the lens module, quality of an image is good. This may mean that the focal length is increased as the ambient temperature is raised.

Figure 16:
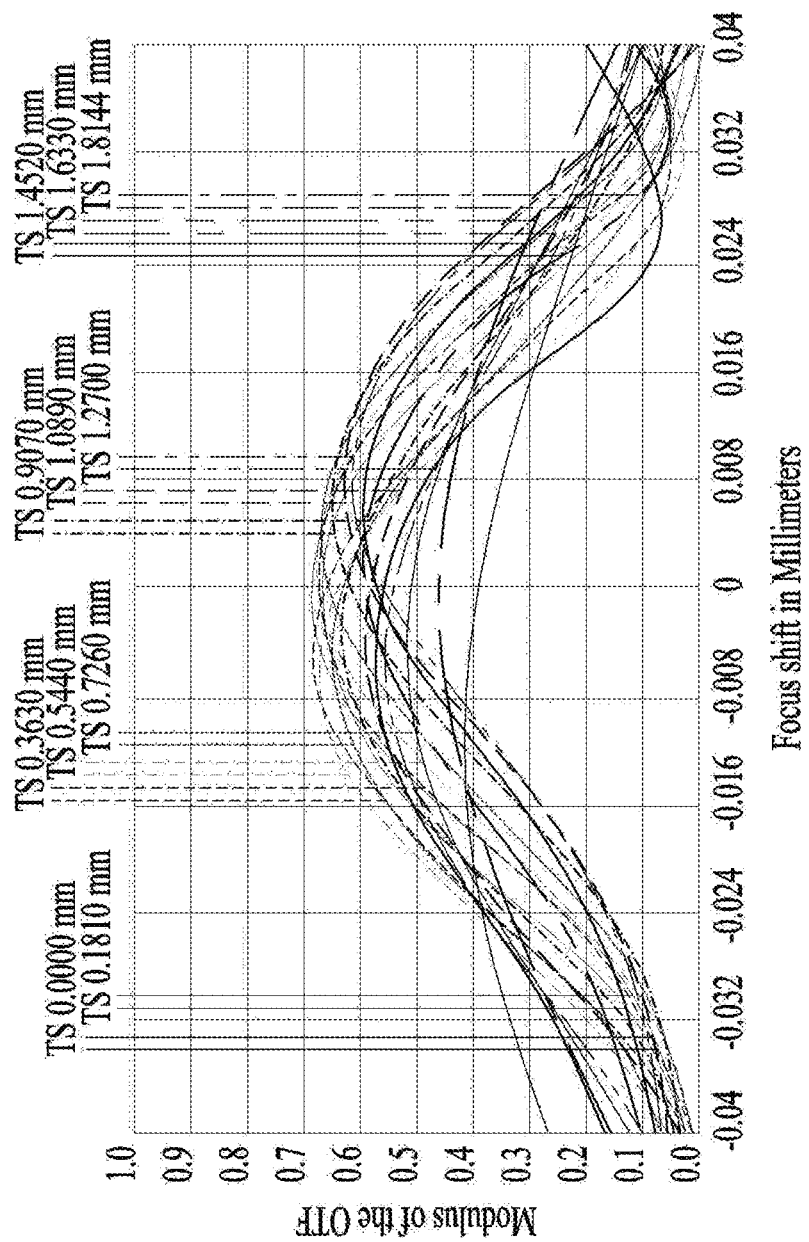
FIGS. 16 to 18 are graphs illustrating operating characteristics of a lens module provided with a variable lens unit.

With reference to FIGS. 14 to 16, the lens module may photograph an image having the greatest quality, if a subject is located at the focal length of the lens module under the temperature condition of 25° C., i.e., a design criterion temperature, and thus exhibit designed performance.

However, when the lens module deviates from the design criterion temperature of 25° C., the lens module may not photograph an image having great quality if a subject is located at the focal length of the lens module. Therefore, if the lens module and the iris recognition camera module including the same deviate from the design criterion temperature, they cannot exhibit designed performance.

Therefore, an image photographed under a temperature condition deviating from the design criterion temperature has low quality and thus may not be used for iris recognition.

Figure 17:
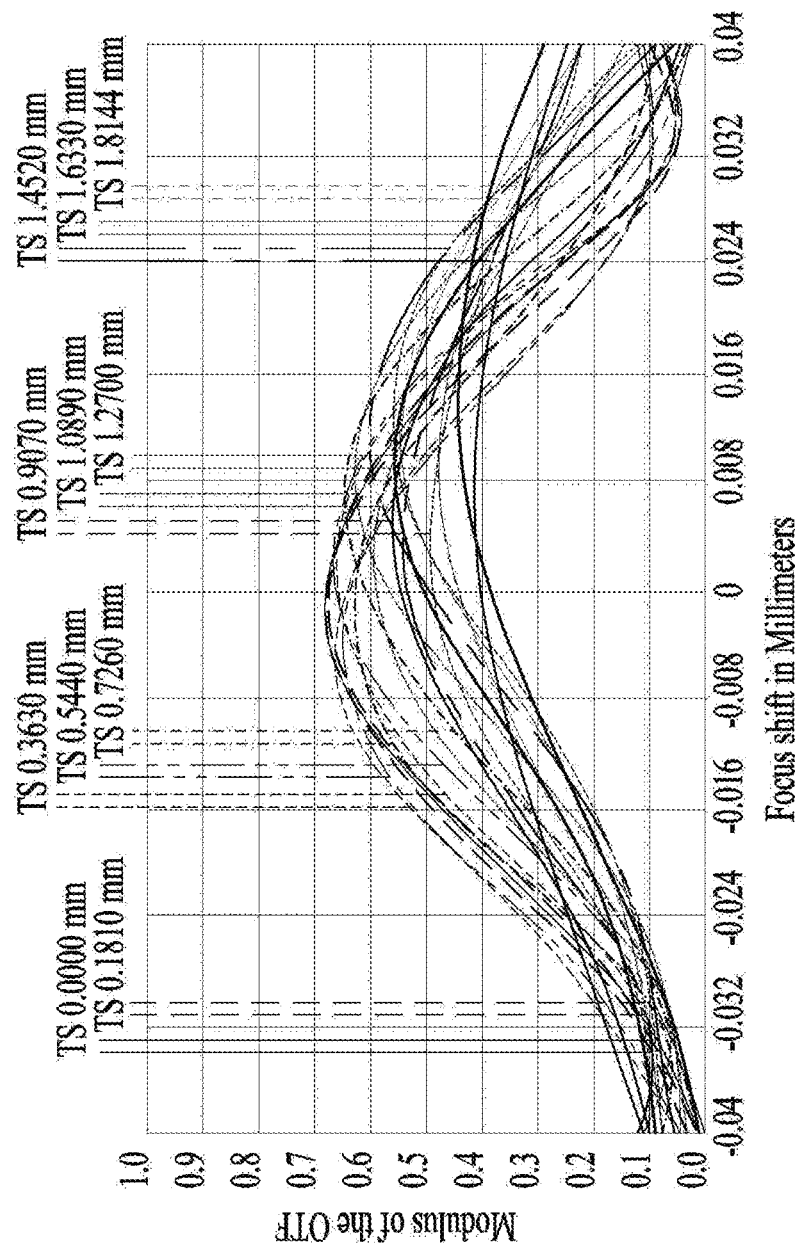
Figure 18:
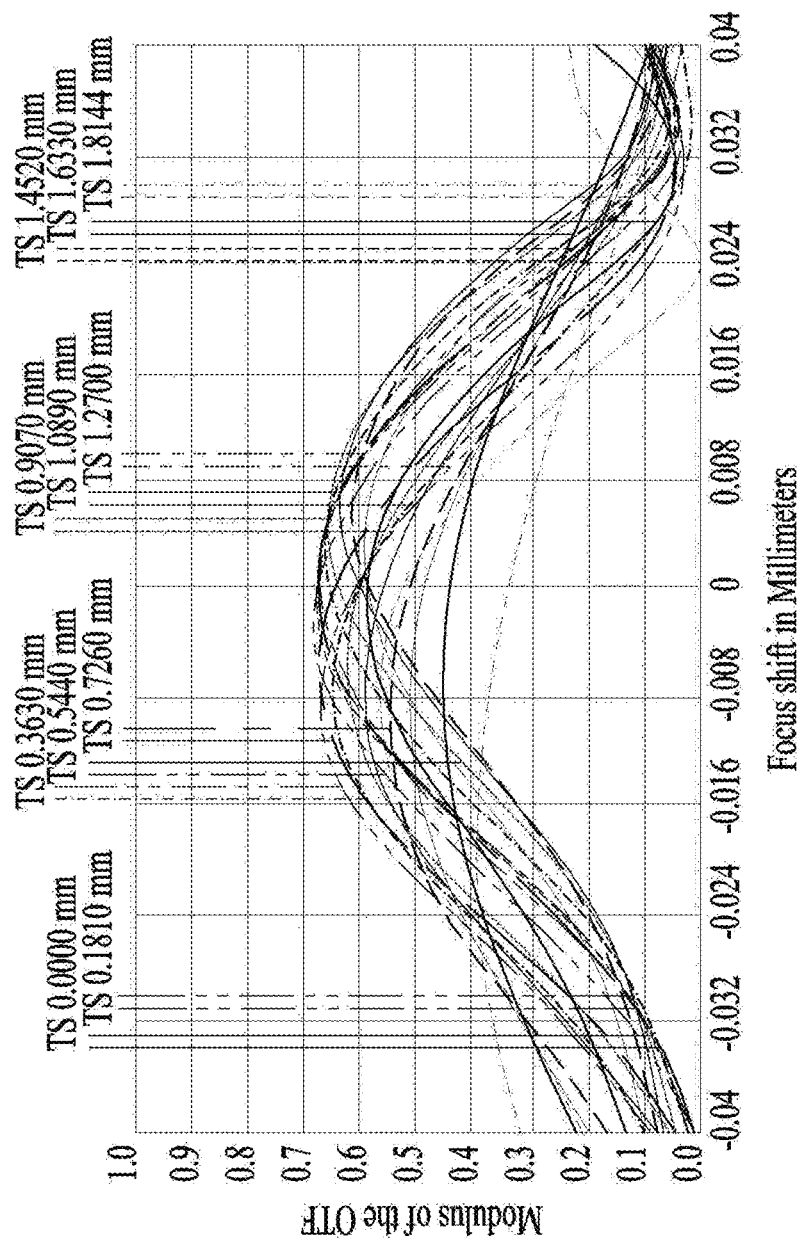

FIGS. 16 to 18 are graphs illustrating operating characteristics of a lens module provided with a variable lens unit 1300. FIGS. 16 to 18 illustrate test results obtained by adjusting the diopter of the lens module using the variable lens unit 1300.

First, optical characteristic curves of FIG. 16 may be used as design criterion values of the lens module in accordance with the embodiment. Here, in FIG. 16, the temperature condition of the lens module is 25° C., and the diopter of the lens module is 0.4. Although the temperature condition and the diopter as the design criterion values of the lens module of the embodiment may be changed, the above temperature condition and diopter are used as the design criterion values for clear description.

In FIG. 17, the ambient temperature around the lens module is changed to about 5° C. and the diopter of the lens module is correspondingly adjusted to about 4 using the variable lent unit 1300.

In FIG. 18, the ambient temperature around the lens module is changed to about 45° C. and the diopter of the lens module is correspondingly adjusted to about 7.6 using the variable lent unit 1300.

Through comparison among FIGS. 16 to 18, the optical characteristic curves of the respective graphs are almost identical. Further, in all of FIGS. 16 to 18, the OTF modulus is highest if the subject is located at the focal length of the lens module, and this means that quality of a photographed image is greatest.

On investigation of the test results shown in FIGS. 16 to 18, it may be understood that focal length change according to temperature change may be suppressed by adjusting the diopter of the lens module in accordance with the embodiment using the variable lens unit 1300.

In accordance with the embodiment, by suppressing focal length change according to temperature change of the variable lens unit 1300, the lens module and the iris recognition camera module including the same may obtain an image of great quality in spite of change in ambient temperature.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

INDUSTRIAL APPLICABILITY

An iris recognition camera system in accordance with one embodiment may provide an optical unit which increases a recognition distance of a designated object while maintaining resolution of the object and maintaining a constant total volume of the camera system, simultaneously. Therefore, the iris recognition camera system is industrially applicable.

The invention claimed is:

1. An iris recognition camera system comprising:
   an optical unit configured to collect optical information of an iris;
   an imaging unit configured to output the optical information of the iris obtained from the optical unit,
   display units respectively arranged at upper, lower, left, and right sides of the imaging unit so as to surround the imaging unit; and
   a control unit configured to control driving of the display units to guide a user to move the iris,
   wherein the optical unit comprises:
   a first group having a first thickness and refracting light incident from an object, the first group comprising a first lens having positive refractive power and having a convex surface on an object side and a concave surface on an image side, and a second lens having negative refractive power and having a concave surface on the object side and a concave surface on the image side; and
   a second group disposed adjacent to a back surface of the first group, the second group comprising third to sixth lenses arranged in an order from the object side to the image side,
   wherein the third lens has positive refractive power, the fourth lens has negative refractive power, the fifth lens has positive refractive power, and the sixth lens has negative refractive power,
   wherein the fourth lens has a concave surface on the image side, and
   wherein the fifth lens has a concave surface on the object side.

2. The iris recognition camera system according to claim 1, wherein the first group has negative refractive power.

3. The iris recognition camera system according to claim 1,
   wherein the display units comprise at least one light emitting module.

4. An iris recognition camera system comprising:
   an optical unit configured to collect optical information of an iris;
   an imaging unit configured to output the optical information of the iris obtained from the optical unit;
   a calculation unit configured to analyze a position of a captured iris image generated by the imaging unit on an image sensor;
   display units arranged at upper, lower, left, and right sides of the imaging unit so as to surround the imaging unit; and
   a control unit configured to control driving of the display units corresponding to a result value outputted from the calculation unit to guide a user to move the iris,
   wherein the optical unit comprises:
   a first group having positive refractive power; and
   a second group having negative refractive power,
   wherein the first group comprises no lens, and the second group comprises first to fourth lenses arranged in an order from an object side to an image side,
   wherein the first lens has positive refractive power, the second lens has negative refractive power, the third lens has positive refractive power, and the fourth lens has negative refractive power,
   wherein the third lens has a concave surface on the object side, and
   wherein the second lens has a concave surface on the image side.

5. The iris recognition camera system according to claim 4, wherein the first group comprises a holographic optical element (HOE).

6. The iris recognition camera system according to claim 5, wherein the holographic optical element (HOE) has a thickness greater than zero and of 0.3 mm or less.

* * * * *